(12) United States Patent
Tomita et al.

(10) Patent No.: US 6,293,374 B1
(45) Date of Patent: Sep. 25, 2001

(54) DRUM BRAKE SEAL STRUCTURE FOR ALL-TERRAIN VEHICLE WHEEL

(75) Inventors: Hiroaki Tomita; Bunzo Seki; Akio Handa; Seiji Kurimoto, all of Wako; Eiji Katabami, Tokyo, all of (JP)

(73) Assignees: Honda Giken Kogyo Kabushiki Kaisha; Arai Seisakusho Co., Ltd., both of Tokyo (JP)

(*) Notice: Subject to any disclaimer, the term of this patent is extended or adjusted under 35 U.S.C. 154(b) by 0 days.

(21) Appl. No.: 09/655,539

(22) Filed: Sep. 6, 2000

(30) Foreign Application Priority Data

Sep. 30, 1999 (JP) .................................................. 11-280781

(51) Int. Cl.[7] ............................. F16D 65/10; F16J 15/34
(52) U.S. Cl. ........................ 188/74; 188/18 R; 188/74; 188/78; 277/361; 277/365; 277/399; 277/402
(58) Field of Search ................. 188/78, 325, 218 A, 188/74, 18 R; 180/244; 277/307, 309, 361, 363, 365, 399, 380, 402, 908

(56) References Cited

U.S. PATENT DOCUMENTS

| | | | |
|---|---|---|---|
| 3,598,417 | * 8/1971 | Mueller | 277/389 |
| 4,243,234 | * 1/1981 | Blaha | 277/84 |
| 4,283,063 | * 8/1981 | Prescott | 277/37 |
| 4,332,310 | * 6/1982 | Iwai et al. | 188/218 A |
| 4,505,484 | * 3/1985 | Ohkuma | 277/94 |
| 4,534,440 | * 8/1985 | Sekizaki | 180/215 |
| 4,627,520 | * 12/1986 | Matsubayashi | 188/18 R |
| 4,854,423 | * 8/1989 | Evans | 188/70 R |
| 5,011,301 | * 4/1991 | Martinie | 384/140 |
| 5,147,139 | * 9/1992 | Lederman | 384/486 |
| 5,522,600 | * 6/1996 | Duckwall | 277/38 |
| 5,553,870 | * 9/1996 | Czekansky | 277/134 |
| 5,618,116 | * 4/1997 | Ishikawa | 384/607 |
| 5,649,710 | * 7/1997 | Kanda | 277/36 |
| 5,775,457 | * 7/1998 | Handa | 180/344 |

FOREIGN PATENT DOCUMENTS

359047530 * 3/1984 (JP) .

* cited by examiner

Primary Examiner—J. J. Swann
Assistant Examiner—David Divine
(74) Attorney, Agent, or Firm—Merchant & Gould P.C.

(57) ABSTRACT

A drum brake includes a brake drum attached to an axle, and a brake panel. The brake drum includes a disc portion and a cylindrical portion extending from an outer peripheral end portion of the disc portion towards the brake panel. On an outer peripheral end portion of the cylindrical portion, there is mounted a seal member. The brake panel includes an annular flat surface portion, and a cylindrical projecting portion projecting from an outer peripheral end portion of the annular flat surface portion towards the brake drum so as to surround the seal member. The seal member has plural resilient axial sealing lips and at least one resilient radial sealing lip. The axial sealing lips are in sealing contact with the annular flat surface portion, and the radial lip is in sealing contact with an inner peripheral surface of the cylindrical projecting portion. Even if the brake drum is axially displaced away from the brake panel due to accidental bending of the axle, the radial sealing lip remains sealingly contact with the inner peripheral surface of the projecting portion.

2 Claims, 4 Drawing Sheets

(a)

(b)

DRUM BRAKE SEAL STRUCTURE FOR ALL-TERRAIN VEHICLE WHEEL

BACKGROUND OF THE INVENTION

1. Field of the Invention

The present invention relates to a drum brake seal structure for an all-terrain vehicle wheel, and more particularly to a drum brake designed to reliably provide a seal between a brake panel and a brake drum even when the brake drum is accidentally displaced from the brake panel.

2. Description of the Related Art

Drum brakes are well known in the art. FIG. 3 hereof shows in cross-section one example of such drum brakes. A drum brake 100 includes a brake panel 101, and a brake drum 105 rotationally mounted to an axle 103 by means of bearings 104, 104. The brake panel 101 has brake shoes 102, 102 (only one shown) operably attached thereto. The brake shoes 102, 102 are disposed to produce friction force in cooperation with the brake drum 105. On an end portion 111 of the brake drum 105, there is mounted a seal member 106. The seal member 106 has lips 107, 108 pressed against a surface of the brake panel 101. A wheel cylinder 112 is provided for pressing the brake shoes 102, 102 against an inner peripheral surface of the brake drum 105. A wheel 114 is attached to the brake drum 105 by means of a bolt 113 and a nut 115. Reference numerals 116, 117 denote an oil seal and a knuckle, respectively.

The end portion 111 of the brake drum 105 is normally spaced from the surface of the brake panel 101 by a distance L1, as shown in (a) of FIG. 4.

As an all-terrain vehicle employing the drum brake 100 travels, the axle 103 can be subjected to an external force.

If the axle 103 is undesirably bent by such an external force, the brake drum 105 may be displaced away from the brake panel 101, as shown by an arrow in (b) of FIG. 4, to thereby provide a distance L1+α between the brake drum 105 and the surface of the brake panel 101.

As the brake drum 105 is displaced away from the brake panel 101, the contact area of the lips 107, 108 and the brake panel 101 becomes less. Thus, when the brake drum 105 is greatly displaced away from the brake panel 101, as shown in (b) of FIG. 4, the seal member 106 can not reliably provide a seal between the brake drum 105 and the surface of the brake panel 101.

SUMMARY OF THE INVENTION

It is therefore an object of the present invention to provide a drum brake seal structure for an all-terrain vehicle wheel, which is designed to reliably provide a seal between a brake panel and a brake drum even if the brake drum is accidentally displaced away from the brake panel.

According to an aspect of the present invention, there is provided a drum brake seal structure for an all-terrain vehicle wheel, comprising: a brake panel; a drum including a disc portion and a cylindrical portion extending from an outer peripheral end portion of the disc portion towards the brake panel; and a seal member mounted on an outer peripheral end portion of the cylindrical portion of the drum. The brake panel is disposed sidewardly of the cylindrical portion of the drum. The brake panel supports brake shoes disposed in such a manner as to be pressed against an inner peripheral surface of the cylindrical portion. The brake panel includes an annular flat surface portion and a cylindrical projecting portion projecting from an outer peripheral end portion of the annular flat surface portion in an axial direction of the drum so as to surround a radially outward side of the seal member. The seal member includes plural sealing lips which are in sealing contact with the brake panel. At least one of the sealing lips is in sealing contact with an inner circumferential surface of the cylindrical projecting portion.

Preferably, the plural lips comprise plural axial sealing lips extending in the same direction substantially parallel to the axis of the drum, and a radial sealing lip extending in a radial outward direction of the drum. The axial sealing lips are in sealing contact with the annular flat surface portion of the brake panel, and the radial sealing lip forms said at least one sealing lip and is in sealing contact with the inner circumferential surface of the cylindrical projecting portion.

Consequently, even if the drum is displaced in the same direction as the axle to thereby provide an increased distance between the brake panel and the drum, the radial sealing lip remains sealingly in contact with the inner peripheral surface of the projecting portion of the brake panel, thus providing a hermetic seal between the brake panel and the drum.

Moreover, while the wheel of the all-terrain vehicle is rotating, the outer lip is subjected to a centrifugal force produced by the rotation. Because of the radial sealing lip extending in a radially outward direction of the drum (i.e., in the direction in which the centrifugal force acts), the radial lip is forced against the inner peripheral surface of the projecting portion of the brake panel under the action of the centrifugal force.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

The term "all terrain vehicle" used herein should be construed as a lightweight, easy-to-operate, and small-sized vehicle such as a leisure buggy capable of making a sharp turn. The all-terrain vehicle may be used for growing crops, rearing livestock, hunting animals, and observing animals, etc.

Figure 1:
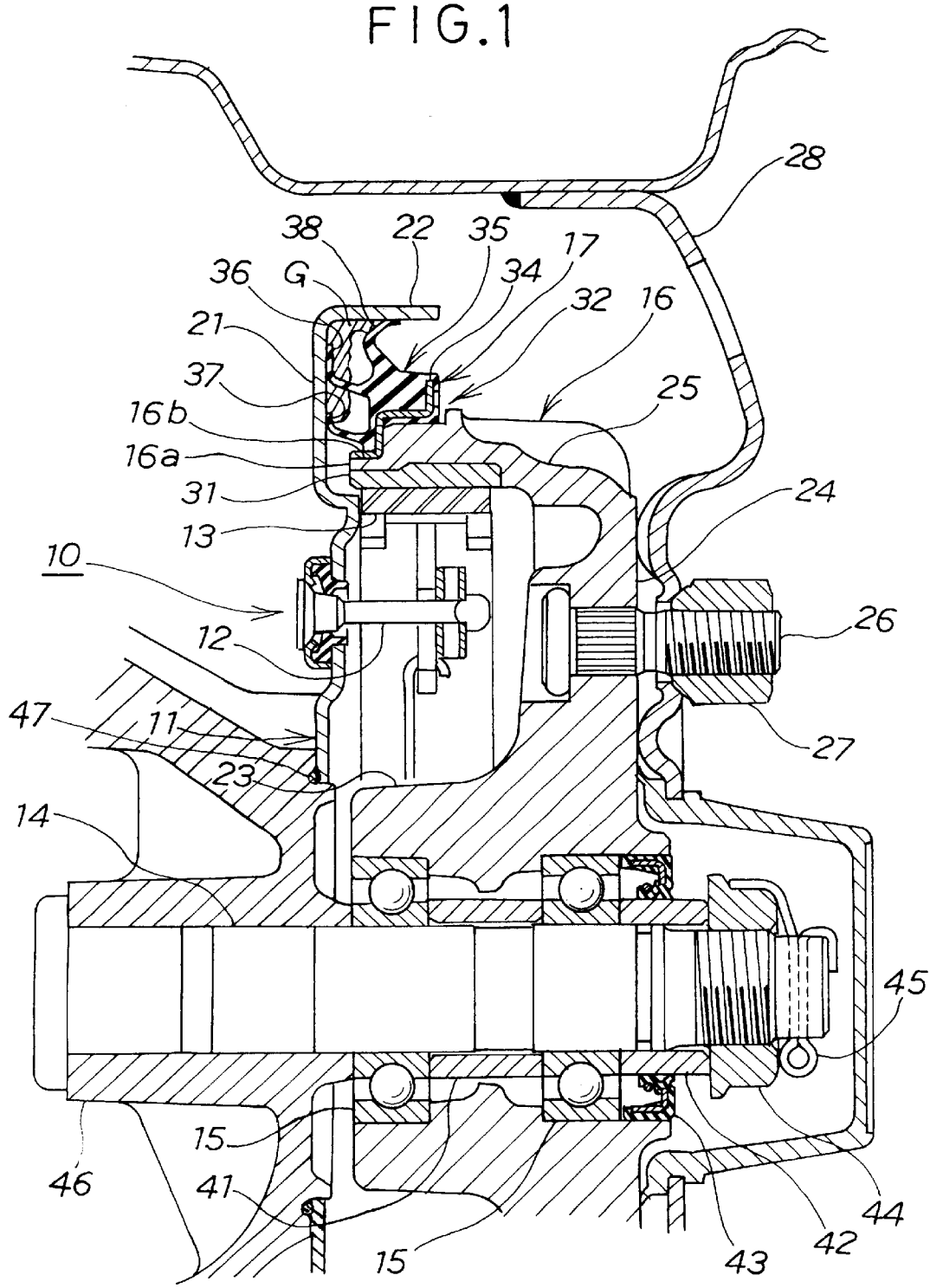
FIG. 1 is a cross-sectional view showing a drum brake for an all-terrain vehicle wheel, constructed in accordance with the present invention.

Referring to FIG. 1, a drum brake 10 is mounted in respective front and rear wheels of the all-terrain vehicle.

The drum brake 10 includes a disk-like brake panel 11. The brake panel 11 supports brake shoes 13, 13 (only one shown) by means of a supporting member 12. The drum brake 10 also includes a drum or brake drum 16 rotationally attached to an axle 14 through bearings 15, 15. The brake drum 16 cooperates with the brake shoes 13, 13 to apply a brake to the all-terrain vehicle. On an end portion of an outer peripheral portion of the brake drum 16, there is disposed a seal member 17 such as an oil seal.

The brake panel 11 includes an annular flat surface portion 21 formed at an outer periphery thereof. The brake panel 11 has a projecting portion 22 formed integrally with an outer peripheral end portion of the annular flat surface portion 21. The projecting portion 22 projects from the outer peripheral end portion towards the brake drum 16. The projecting portion 22 is formed along the outer peripheral end portion of the annular flat surface portion 21 to thereby provide a cylindrical configuration. The projecting portion 22 so extends as to surround a radially outward side of the seal member 17.

The brake drum 16 includes a boss portion 23 attached to the axle 14, a disc portion 24 extending radially outwardly from the boss portion 23, and a cylindrical portion 25 extending from an outer peripheral end portion of the disc portion 24 towards the brake panel 11. The brake panel 11 is disposed sidewardly of such a cylindrical portion 25.

Plural bolts 26 (only one shown) extend through the disc portion 24 and project out of a wheel 28 of the all-terrain vehicle. By turning plural nuts 27 (only one shown) on the bolts 26, the disc portion 24 is attached to the wheel 28.

The cylindrical portion 25 has a contact portion 31 formed on an inner peripheral portion thereof. The brake shoes 13, 13 are disposed in such a manner as to be pressed against the contact portion 31. Provided at an outer peripheral end portion of the cylindrical portion 25 is a mounting portion 32 having the seal member 17 mounted thereon.

The seal member 17 includes a generally ring-like seal body 35 formed from a resilient material such as rubber, and a generally ring-like support core 34 partly embedded in the seal body 35 and mounting the seal body 35 onto a mounting portion 32 provided at the outer peripheral end portion of the brake drum 16. The support core 34 is made of metal and serves also as a reinforcement member for reinforcing the seal member 17. The seal body 35 includes resilient side lips 36, 37 extending in a uniform direction substantially parallel to the axis of the drum 16, that is, the axial direction of the axle 14. The seal body 35 also includes an outer lip 38 disposed on a radial outward side of the side lips 36, 37 and extending in a radial outward direction of the drum 16. The side lips 36, 37 and the outer lip 38 extend in directions different from each other. In view of the orientation, the side lips 36, 37 are hereinafter referred to as "axial lips", and the outer lip is hereinafter referred to as "radial lip". The axial lips 36, 37 are in sealing contact with the annular flat surface portion 21 of the brake panel 11 to provide a hermetic seal therebetween. The radial lip 38 is in sealing contact with an inner peripheral surface of the projecting portion 22 to form a hermetic seal therebetween.

Figure 2A:
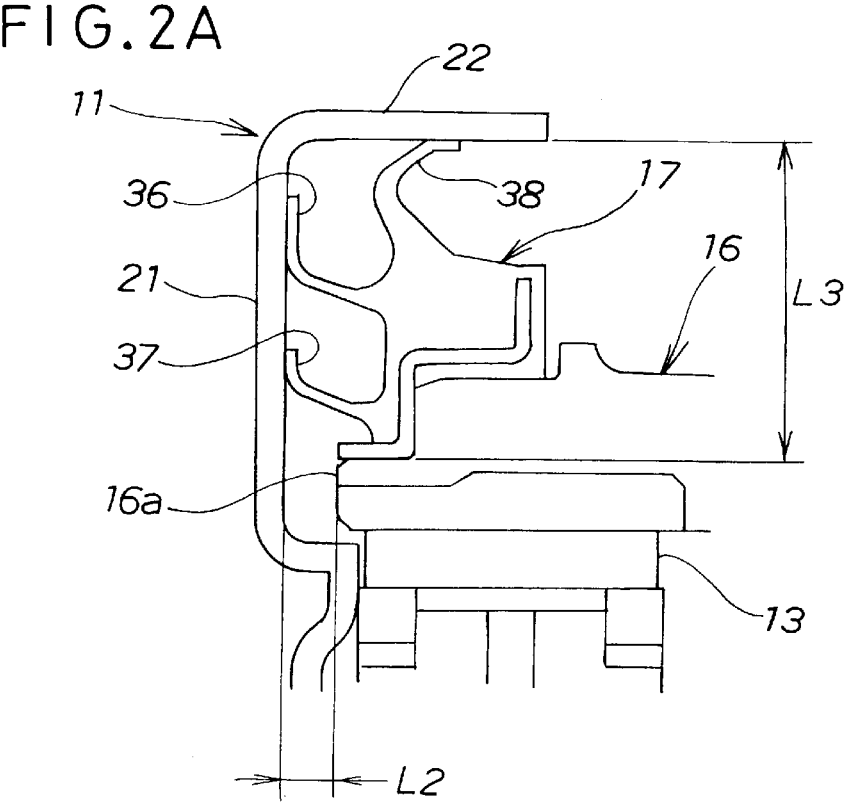
FIG. 2A shows a seal member provided between a brake panel and a drum of the drum brake as shown in FIG. 1.

An end portion 16a of the cylindrical portion 25 is spaced from the annular flat surface portion 21 by a distance L2 (shown in FIG. 2A). The mounting portion 32 (FIG. 1) of the brake drum 16 includes a cylindrical engagement surface 16b with which the support core 34 is firmly fitted. Reference numerals 41, 42 denote collars. Designated by reference numerals 43, 44, 45, 46 and 47 are an oil seal, a nut, a split pin, a knuckle, and an O-ring, respectively. A grease G is provided for lubricating the contacting surface between the annular flat surface portion 21 and cylindrical projecting portion 22 of the brake panel 11 and the axial and radial lips 36–38 of the seal member 17 while the wheel 28 is rotating. The grease G serves also as a sealant against entry of foreign matter, such as rain water, dust or dirt, into the interior of the drum brake The radial lip (outer lip) 38 serves to prevent the grease G from moving past the radial lip 38 in a direction toward the brake drum 16 under the action of centrifugal force when the wheel 28 is rotating.

The seal member 17, the oil seal 43, the O-ring 47, and a seal member (not shown) provided between the axle 14 and the knuckle 46 cooperate with each other to prevent rain-water or dirt from entering a space within which the brake shoes 13, 13 are accommodated.

Turning to FIG. 2A, in the normal condition, the end portion 16a of the brake drum 16 is axially spaced from the annular flat surface portion 21 of the brake panel 11 by the distance L2 while the cylindrical engagement surface 16b is radially spaced from the projecting portion 22 by a distance L3.

Figure 2B:
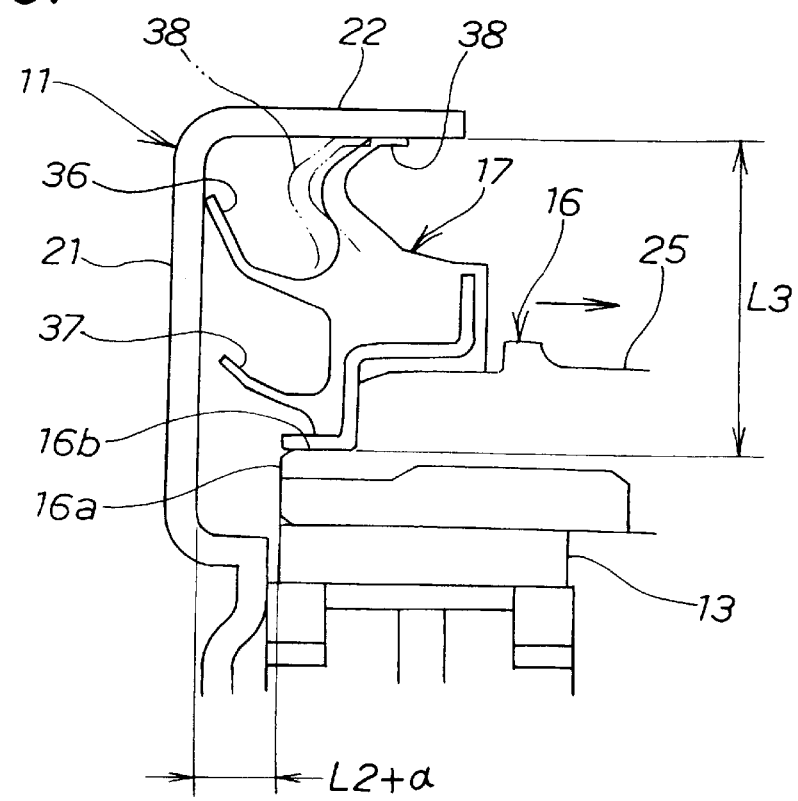
FIG. 2B shows the brake panel and the drum displaced from the brake panel with the seal member provided therebetween.
Figure 3:
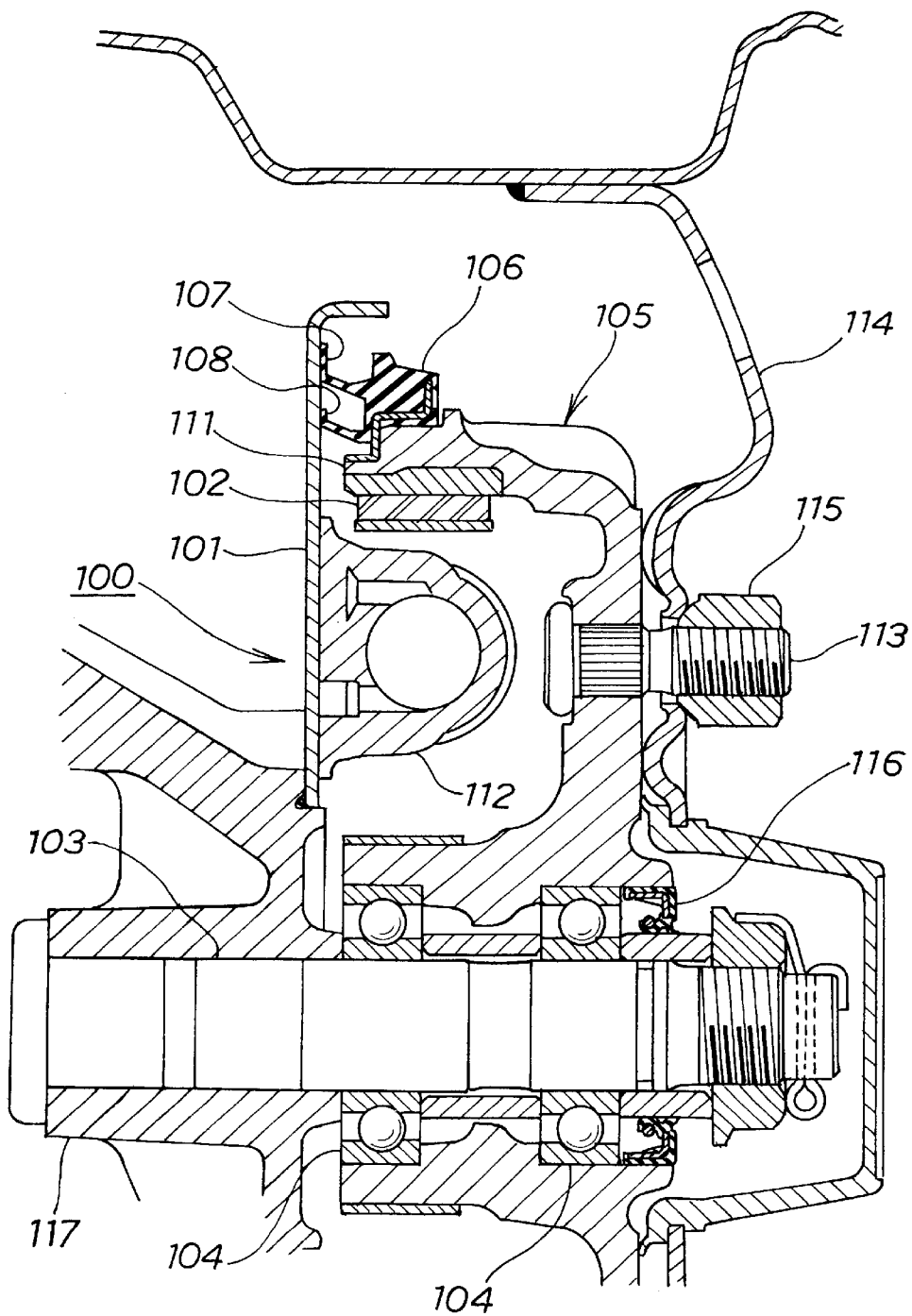
FIG. 3 is a cross-sectional view showing a conventional drum brake for an all-terrain vehicle.
Figure 4:
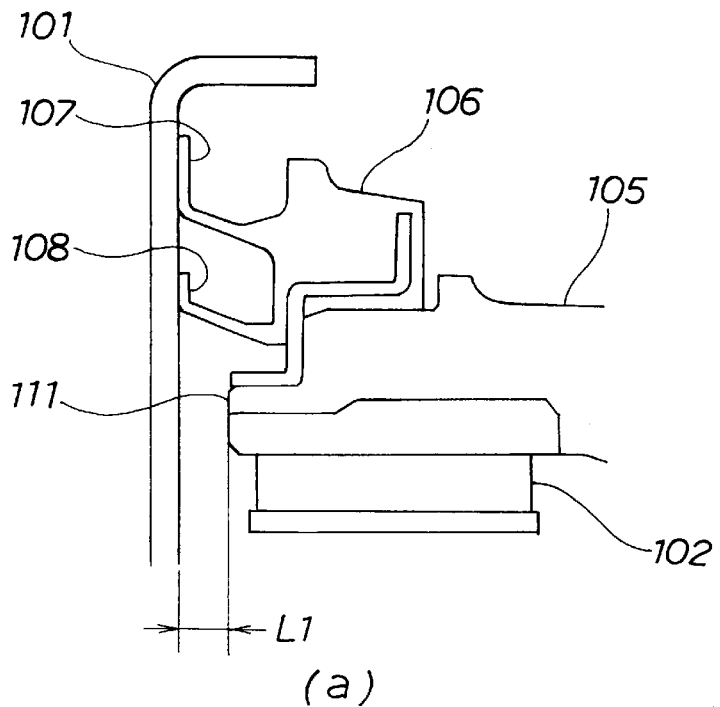
FIG. 4 diagrammatically illustrates a problem occurring when a drum and a brake panel of the conventional drum brake are axially displaced away from each other due to bending of an axle of the vehicle.
Figure 4:
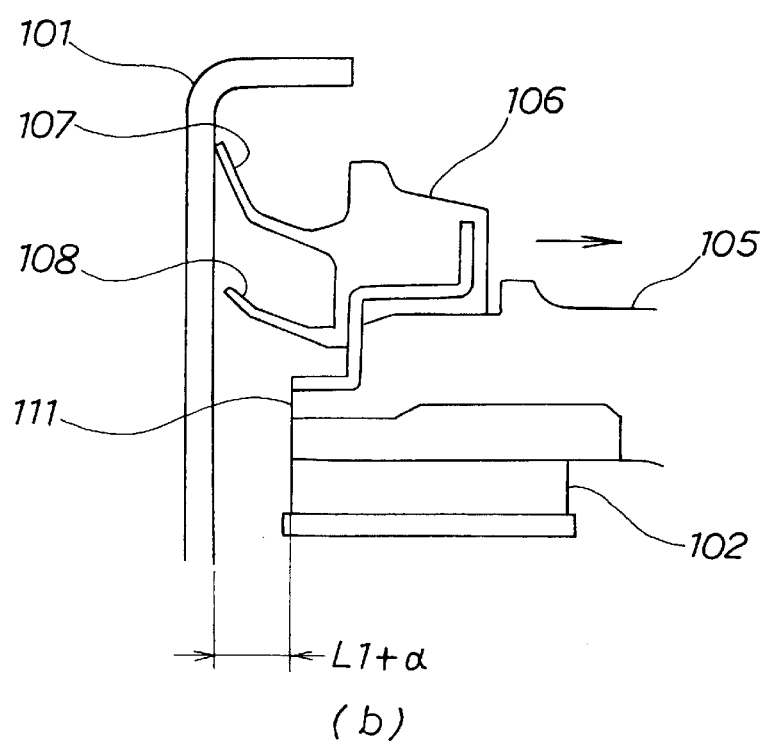

When subjected to an external force during running of the all-terrain vehicle, the axle 14 can be bent by such an external force to thereby displace the cylindrical portion 25 of the brake drum 16 away from the brake panel 11, as shown by an arrow of FIG. 2B. This displacement of the cylindrical portion 25 provides an increased distance between the end portion 16a and the annular flat surface portion 21. As a result, the end portion 16a is spaced from the annular flat surface portion 21 by a distance L2+α, as shown in FIG. 2B.

With the distance L2+α a provided between the end portion 16a and the annular flat surface portion 21, the axial lip 36 still remains sealing contact with the brake panel 11 but can provide a reduced contact area with respect to the annular flat surface portion 21. This means that the sealing pressure or force of the axial lip 36 is reduced. The axial lip 37, which is shorter than the axial lip 36, is completely separated from the brake panel 11 and hence has no function as a seal member.

In response to the axial displacement of the brake drum 16 described above, the radial lip 38 is resiliently deflected to displace in an axial direction from the normal position indicated by a phantom line to a position indicated by a solid line. However, since the axial distance between the cylindrical engagement surface 16b and the cylindrical projecting portion 22 is substantially constant, the surface of the radial lip 38 does not undergo resilient deformation in the radial direction thereof. This means that the engagement surface 16b remains spaced from the projecting portion 22 by the distance L3. Therefore, the radial lip 38 can maintain a prescribed contact surface and a resulting sealing pressure or force with respect to the inner circumferential surface of the cylindrical projecting portion 22 of the brake panel 11. Thus, the seal member 17 is able to provide a hermetic seal between the brake panel 11 and the brake drum 16 even when the brake panel 11 and the brake drum 16 are axially displaced in a direction away from each other.

Moreover, when the wheel 28 is rotating, the radial lip 38 is subjected to a centrifugal force. Since the radial lip 38 extends in a radial outward direction of the brake drum 16, such a centrifugal force acts to force the radial lip 38 against the inner peripheral surface of the projecting portion 22, thereby enabling the radial lip 38 to maintain a sealing contact with the inner peripheral surface of the projecting portion 22.

As is apparent from the foregoing description, it will be appreciated that when the brake drum 16 is displaced in an axial direction away from the brake panel 11 due to bending of the axle 14, one or both of the axial lips 36, 37 may be separated from the annular flat surface portion 21 of the brake panel 11. However, the least the radial lip 38 of the seal member 17 still remains contact with the projecting portion 22 and provides a hermetic seal between the brake panel 1 and the brake drum 16.

Obviously, various minor changes and modifications of the present invention are possible in the light of the above teaching. It is therefore to be understood that within the scope of the appended claims, the present invention may be practiced otherwise than as specifically described.

What is claimed is:

1. A drum brake seal structure for an all-terrain vehicle wheel, comprising:

a brake panel;

a drum including a disc portion and a cylindrical portion extending from an outer peripheral end portion of said disc portion towards said brake panel;

a seal member mounted on a mounting portion of an outer peripheral end portion of said cylindrical portion of said drum, said brake panel being disposed sidewardly of said cylindrical portion of said drum and having an annular flat surface portion and a cylindrical projecting portion projecting from an outer peripheral end portion of said annular flat surface portion axially of said drum; said cylindrical projecting portion extending on a radially outward side of said seal member so as to substantially surround said mounting portion, said seal member being disposed between an inner circumferential surface of said cylindrical projecting portion and an outer peripheral end portion of said cylindrical portion and including plural sealing lips held in sealing contact with said brake panel, at least one of said sealing lips being in sealing contact with an inner circumferential surface of said cylindrical projecting portion.

2. A drum brake seal structure for an all-terrain vehicle wheel as claimed in claim 1, wherein said plural sealing lips comprise plural axial sealing lips extending in the same direction substantially parallel to the axis of said drum, and at least one radial sealing lip extending in a radially outward direction of said brake drum, said axial lips having top ends bent in a direction substantially perpendicular to said drum axis so as to be brought into sealing contact with said annular flat surface portion of said brake panel, and said radial sealing lip having a top end bent in a direction substantially perpendicular to said radially outward direction so as to be brought into sealing contact with said inner circumferential surface of said cylindrical projecting portion of said brake panel.

* * * * *